(12) United States Patent
James et al.

(10) Patent No.: US 7,030,064 B2
(45) Date of Patent: Apr. 18, 2006

(54) BENTONITE NODULES

(75) Inventors: Maurice L. James, Highlands Ranch, CO (US); Kieth A. Hejl, Bakersfield, CA (US)

(73) Assignee: Benterra Corporation, San Ramon, CA (US)

( * ) Notice: Subject to any disclaimer, the term of this patent is extended or adjusted under 35 U.S.C. 154(b) by 0 days.

(21) Appl. No.: 10/660,338

(22) Filed: Sep. 10, 2003

(65) Prior Publication Data

US 2004/0045711 A1 Mar. 11, 2004

Related U.S. Application Data

(62) Division of application No. 09/964,930, filed on Sep. 26, 2001, now Pat. No. 6,820,692.

(60) Provisional application No. 60/237,945, filed on Oct. 3, 2000.

(51) Int. Cl.
*C09K 7/00* (2006.01)

(52) U.S. Cl. .................. 507/100; 507/200; 507/906; 166/292

(58) Field of Classification Search .............. 507/100, 507/200, 906; 166/292
See application file for complete search history.

(56) References Cited

U.S. PATENT DOCUMENTS

| 47,410 A | 4/1865 | Fraser |
| 2,609,880 A | 9/1952 | Dyer |
| 2,634,098 A | 4/1953 | Armentrout |
| 2,642,268 A | 6/1953 | Armentrout |
| 2,836,555 A | 5/1958 | Armentrout |
| 2,856,354 A | 10/1958 | Armentrout |
| 2,935,472 A | 5/1960 | Klaas et al. |
| 4,217,965 A * | 8/1980 | Cremeans ............ 175/72 |
| 4,462,470 A | 7/1984 | Alexander et al. |
| 4,836,940 A * | 6/1989 | Alexander ............ 507/119 |
| 4,886,550 A | 12/1989 | Alexander |
| 4,894,285 A * | 1/1990 | Fitzgibbob ............ 428/402 |
| 4,936,386 A | 6/1990 | Colangelo |
| 5,195,583 A | 3/1993 | Toon et al. |
| 5,611,400 A | 3/1997 | James et al. |
| 5,657,822 A | 8/1997 | James et al. |
| 5,810,085 A | 9/1998 | James et al. |
| 6,825,152 B1 * | 11/2004 | Green ............ 507/104 |

OTHER PUBLICATIONS

Bourgoyne, A., et al., "Sustained Casing Pressure in Offshore Producing Wells", *OTC 11029*, pp. 1-13, (May 1999).
Chevron Environmental Management Co., "Coalinga Abandonment Pilot: Technical Report on the Utilization of Sodium Bentonite in the Abandonment of Oil Fields"(Jul. 2000).
Daemen, J., et al., "Bentonite as a Waste Isolation Pilot Plant Shaft Sealing Material", *Contractor Report SAND 96-1968* Unlimited Release UC-721, (Dec. 1996).
Daemen, J., Letter to M. James re: Plugging Depleted Oil Wells, (Mar. 22, 1998).

(Continued)

*Primary Examiner*—Philip C. Tucker
(74) *Attorney, Agent, or Firm*—Buchanan Ingersoll PC

(57) ABSTRACT

Compressed bentonite-containing nodules are disclosed as are methods for their production and methods for using them to plug wells.

9 Claims, 3 Drawing Sheets

OTHER PUBLICATIONS

DeGroot, D., "Comments on Petro-Plug's Proposed Procedure for Sealing Abandoned Oil Wells", *Report Prepared for M. James, UMASS at Amhers*, (Mar. 14, 1998).

DeGroot, D., et al., "Evaluation of Dispersion Characteristics of Bentonite with Application to Design of Containment Transport Barriers", *4th International Symposium on Envir. Geotech. Global Sustainable Dev., Boston Mass* (Aug. 1998).

Ehlers, "Report of Pressure Tests, Plugging Simulations", *Accord Technologies*, pp. 1-10, (Mar. 1999).

Ehlers, "Report of Well Test", *Accord Group, Inc.*, (Oct. 27, 1997).

Ehlers, GC, for the Accord Group Inc., Technical Note, (Oct. 29, 1997).

Goodwin, et al., "Cement Sheath Stress Failure", *SPE Publication No. 20453*, Halliburton Services (1990).

James, M., "Using Coarse Ground Bentonite to Plug Abandoned Holes", *WWJ*, (Jun. 1996).

Kenney, et al., "Hydraulic Conductivity of Compacted Bentonite-Sand Mixtures", *Canadian Geotech. J.*, vol. 29, No. 3, (Jun. 1992).

Lamborn, D., Letter to Gordon Fassett at the Pittsburg & Midgway Coal Mining Co. Re: Cancellation of Permit UW43569 (Jan. 23, 1997).

Odell, R., Letter to J. James Re: In Situ Uranium Drill Holes, (Aug. 22, 1999).

Ogden & Ruff, "Report-Axial Shear Strength Testing of Bentonite Water Well Annulus Seals", *Colo. State Univ. Dept of Civ. Eng.*, (Fall 1989).

Petro-Plug: Wellborne Plug Stage Pressure Analysis Project 2 pages (no date).

RMOTC, "Bentonite Well Plugging Technique", *Field Applications*, (Feb. 1998).

Ruhl & Daniel, "Geosynthetic Clay Liners Permeated with Chemical Solutions and Leachates", *J. of Geotech. & Geoenv. Eng.*, pp. 369-381, (Apr. 1997).

Sessions, LA, "Plugging of C-1 & C-2 Monitor Wells-I Area", *Memorandum to GA Johnson*, (Jan. 14, 1997).

Thornhill, J., *Results of USEPA's Robert S. Kerr Environmental Research Center's Integrity Testing Facility Near Ada. Okalhoma*, Letter and Report to M. James, pp. 44-47, (Jan. 2000).

Towler & Ehlers, "Friction Factors for Hydrated Bentonite Plugs", *SPE Publication No. 38347*, pp. 111-116, (May 1997).

Turner, C., "Letter of Support", to Maurice Turner, pp. 1-11, (Jan. 8, 1998).

Tyler, "Petro-Plugging Project Test Results", *RMOTC*, (Jan. 5, 1998).

Wheaton, et al., "Experiments in Subsurface Applications of Bentonite in Montana", *Montana Bureau of Mines Report: Memoir No. 66*, (1994).

* cited by examiner

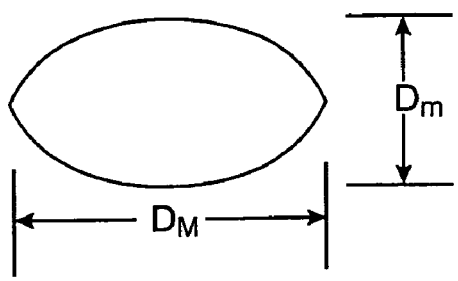
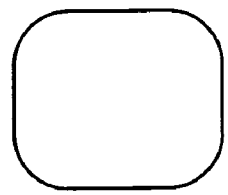
FIG. 1A    FIG. 1B
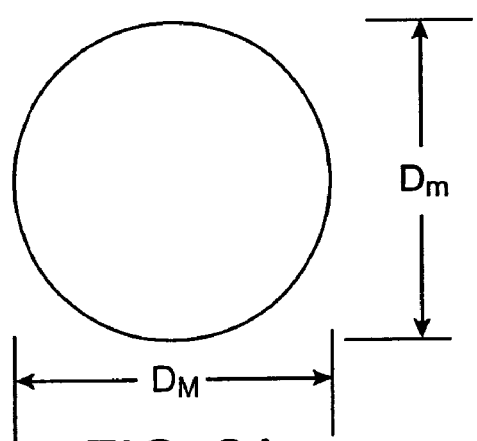
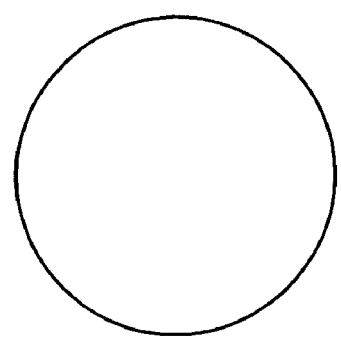
FIG. 2A    FIG. 2B
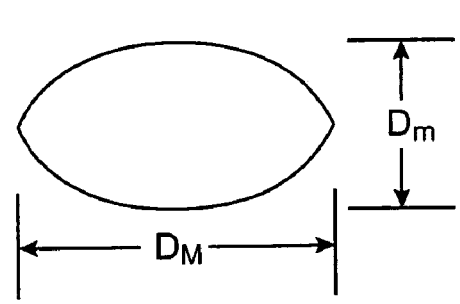
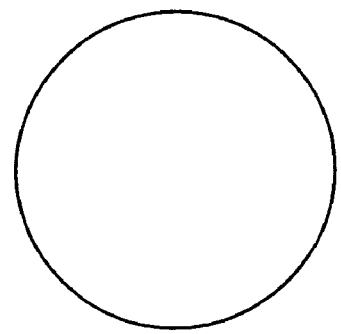
FIG. 3A    FIG. 3B

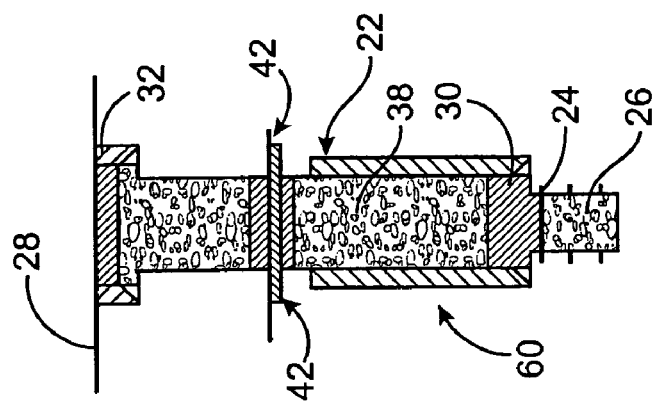
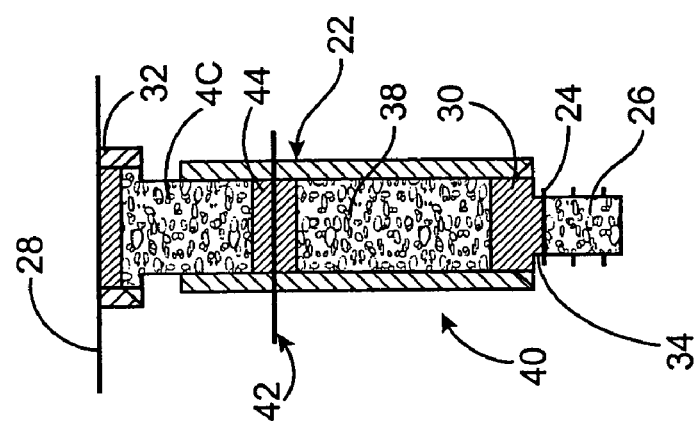
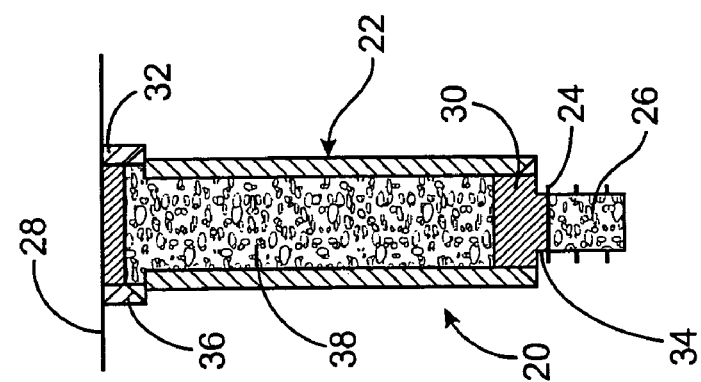

BENTONITE NODULES

This application is a divisional of U.S. Ser. No. 09/964,930 filed Sep. 26, 2001, now U.S. Pat. No. 6,820,692; which application claims the benefit of U.S. Provisional Application No. 60/237,945 filed on Oct. 3, 2000, now abandoned. Each of these applications are incorporated herein by reference in their entirety.

BACKGROUND OF THE INVENTION

1. Field of the Invention

The present invention relates in general to filling or plugging wells. In particular, the present invention relates to improved materials for plugging wells such as drill holes within the earth and for maintaining the plug integrity indefinitely, methods for preparing the materials and methods for using the materials.

2. Description of the Related Art

It has been well known to provide deep (on the order of several hundred feet to thousands of feet) and shallow (on the order of twenty to several hundred feet) wells such as drill holes within the earth for a variety of purposes. Relatively shallow drill holes are formed during seismic exploration, water wells, monitoring wells, cathodic protection wells and mineral exploration and extraction wells and other purposes. Deeper holes are typically formed during standard oil, gas, and/or disposal well operations. A deep drill hole is formed and then lined with a casing. The drill hole generally passes through several compositions, such as hard compacted soil, clay, loose sand, and other typical geologic materials, in addition to one or more water-bearing layers. Such water-bearing layers may represent a saline water source or a fresh water aquifer. Once the well bore is determined to be unusable, the well bore is abandoned. If left unsealed, gases and/or liquids escape from the zones of origination and migrate through the hole. Further, the casings corrode and disintegrate causing additional migration pathways.

In particular, a fresh water aquifer may "leak" through the casing and hole into a fracture or uncharged zone, causing loss of water from the aquifer. A drill hole extending between a saline water source or petroleum and a fresh water aquifer may allow commingling of these zones, damaging both. Additionally, contamination from the surface may cause damage, such as contaminated water passing downward through the hole and casing into a fresh water aquifer. These problems can also occur with shallow holes.

To overcome these problems it has been known to plug the casings and drill holes with cement. However, cement has proven less than effective in maintaining the integrity of the seal throughout the casing over long periods of time. One problem with cement plugs is that voids can occur during placement of the cement slurry in the casing as a result of incomplete displacement of drilling fluids by the slurry. In addition, cured cement is brittle and can crack over the life of the plug due to pressure changes or due to earthquake activity. Cured cement undergoes strength retrogression at temperatures above 230° F. if the cement does not contain additional silica. All of these factors can contribute to limited success with cement plugs.

In the past, sodium bentonite has been proposed for filling drill holes. Early work focused on the use of finely ground bentonite for filling relatively shallow holes. A report entitled "Axial Shear Strength Testing of Bentonite Water Well Annulus Seals" by Fred Lee Ogden and James F. Ruff published by Colorado State University, 1989, discusses the use of bentonite as an annulus sealant. Past usage of bentonite is explained in a report entitled "Experiments in Subsurface Applications of Bentonite in Montana" by John Wheaton, Steve Regele, Bob Bohman, Dave Clark and Jon Reiten, published by Montana Bureau of Mines and Geology, 1994. Both of the foregoing reports are incorporated herein by reference.

When bentonite as ⅜" in diameter or smaller chips is poured into a hole it begins to expand when exposed to water. This method is adequate for shallow holes since the bentonite sinks to the bottom of the hole before a significant amount of swelling occurs. However, if bentonite is poured into deep well holes, the hole may contain several hundred feet of water.

In general, high-grade and low-grade bentonite chips fall through water at an average velocity of about 1 ft/sec. Smaller bentonite granules of ⅜" in diameter or less fall more slowly than larger particles for two reasons. First, smaller particles have more surface area per unit weight, and therefore proportionally more drag in the water. Also smaller bentonite granules are typically less dense than larger chips. A bentonite granule with a diameter of ⅜" may have a volume of 0.5 $cm^3$ and weigh 1.01 grams, while a bentonite chip with a ¾" diameter weighs 3.65 grams and has a volume of 1.50 $cm^3$. In this example, the smaller granule has a density of 2.02 gr/$cm^3$ and the larger chip has a density of 2.43 gr/$cm^3$.

Once hydration begins, the density (or specific gravity) of the granule decreases as the granule swells. Similarly, the fall velocity of the granule in water decreases at a rate of about 0.009 ft/sec per minute of fall. For instance, a small granule having an initial fall velocity in water of just under 1 ft/sec, after 44 minutes of exposure to water, will fall at a rate of approximately 0.6 ft/sec. As the granule absorbs water, its density decreases approaching the density of water further slowing the fall velocity. These factors prevent small granules from effectively being used to plug deep holes with several hundred feet of water therein.

U.S. Pat. No. 5,611,400 of James et al. describes the use of coarse dry dehydrated ground chips of sodium bentonite as a well plugging material. The chips are from ¼" to about 2" in size. U.S. Pat. No. 5,810,085 of James et al. describes the use of large pieces of bentonite having a minimum diameter of at least ⅞" and up to at least about 3 inches as a well hole-plugging material.

These patents describe relationships between particle size and particle performance during well plugging. They point out that each particle expands at a rate proportional to the liquid content of the particle. The rate of hydration of a given particle is related to the surface area of the particle and the volume of the particle. However, the volume and the surface area of a particle vary with respect to the particle diameter. The ratio of particle surface area to particle volume decrease as the particle diameter increases. Accordingly, the rate of hydration decreases (as does the rate of expansion) with increased particle diameter.

As noted above, it is desirable that the particles have a diameter of at least ⅞". A particle with a diameter of less than ⅞" hydrates and may expand too rapidly to allow the particle to reach the bottom of a deep hole before plugging the hole. By way of example, fine bentonite particles with a ⅜" diameter may hydrate and swell to 10 times their original size and turn to a slurry state in less than 15 minutes. Often drill holes are several hundred feet deep with over a hundred feet of liquid. Each particle falls at a rate dependent upon the particle's density and the liquid's viscosity. However, generally the density of the bentonite and the viscosity of the liquids within the holes are such that a particle having 3/8" diameter falls at a rate of one foot per second. As the particle swells, its density decreases and its surface area increases, further reducing its fall velocity. Such particles require several minutes to reach the hole's bottom. Accordingly, 3/8" particles may swell and plug the hole before reaching the bottom or turn to a slurry state.

Another factor which plays a part in the use of bentonite as a material for plugging wells, drill holes and the like is salinity. Saline water is found in many wells. High salt contents in saline water can interfere with bentonite particles by promoting breakdown and flaking which could reduce the density of the plug when hydrated. A preferred form of bentonite would minimize these problems.

Large-particle bentonite materials have been formed heretofore as chunks and as extrudates. Chunks are accompanied by a large quantity of fines which must be removed. Chunks are irregular and often lead to bridging. Extrudates are difficult and slow to manufacture. They often lack physical integrity.

There is a need for an optimal large particle form of bentonite which is convenient to use, inexpensive to form, strong and durable which requires minimal removal of deleterious fines.

Listing of Background Materials
U.S. Pat. Nos.
2,609,880
4,886,550
4,936,386
5,195,583
5,657,822
5,810,085
"Bentonite as a Waste Isolation Pilot Plant Shaft Sealing Material", Contractor report, SAND 96-1968 Unlimited Release UC-721, Jaak Daemen and Chongwei Ran, University of Nevada-Reno, December 1996.
"Bentonite Well Plugging Technique", from Field Applications publication by RMOTC, February 1998.
"Cement Sheath Stress Failure", SPE 20453, Goodwin and Crook, September 1990.
"Experiments in Subsurface Applications of Bentonite in Montana", Wheaton et al., 1994.
"Friction Factors for Hydrated Bentonite Plugs", SPE 38347, Towler & Ehlers, May 1997.
"Geosynthetic Clay Liners Permeated with Chemical Solutions and Leachates", Journal of Geotechnical and Geoenvironmental Engineering, Ruhl & Daniel, April 1997.
"Hydraulic Conductivity of Compacted Bentonite-Sand Mixtures", Canadian Geotechnical Journal, Volume 29, Number 3, Kenney et al., June 1992.
"Report-Axial Shear Strength Testing of Bentonite Water Well Annulus Seals", State University, Ogden & Ruff, Fall 1989.
"Sustained Casing Pressure in Offshore Producing Wells", OTC 11029, Bourgoyne et al., May 1999.
"Using Coarse Ground Bentonite to Plug Abandoned Holes", Melvyn James, in WWJ, June 1996.
*Handbook on Well Plugging and Abandonment*, Pennwell Publishing Company, Dwight K. Smith, 1993.
"Hydraulic Conductivity Tests on Compacted Clay", Journal of Geotechnical Engineering, Boynton, S. S. & Daniel, D. E., 1985.
"Mineral Water Interactions and Their Influence on the Physical Behavior of Highly Compacted Bentonite", Canadian Geotechnical Journal, R. Pusch, 1982.
"State of the Art Evaluation of Repository Sealing Materials and Techniques", Materials Research Society, Gnirk, P. 1988.
"The Effects of Brine Contamination on the Properties of Fine Grained Soils", Geotechnical Practice for Waste Disposal '87, Proceedings of a Specialty Conference, Ho, Y. A., Jun. 15–17, 1987.
"The hnpact of a NaCl Brine on the Behaviour of Compacted Fine Grained Soil", University of Windsor, Department of Civil Engineering, Ridley, K. J. D., Bewtra, J. K. and Mccorquodale, J. A. 1983.
"Abandoned Wells", paper by Maurice James, January 2000.
"Comments on Petro-Plug's Proposed Procedure for Sealing Abandoned Oil Wells", prepared for Maurice James by David DeGroot (UMASS at Amherst), Mar. 14, 1998.
"Evaluation of Dispersion Characteristics of Bentonite with Application to Design of Containment Transport Barriers", DeGroot et al., August 1998.
"Plugging of C-1 & C-2 Monitor Wells-I Area", Memorandum from L. A. Sessions to G. A. Johnson, Jan. 14, 1997.
"Report of Pressure Tests, Plugging Simulations", Accord Technologies, Ehlers, March 1999.
Comments from Dr. Roland Pusch to Craig Gardner regarding "Well Abandonment, Compressed Bentonite Questions", Ideon Research Center, SE-22370 Lund, Sweden, June 2000.
"Design and construction of a prehydrated sand-Bentonite Liner to contain Brine," M. D. Haug, Barbour and Longval, 1988.
Letter and Report to Maurice James from Jerry Thornhill (Consultant) providing results from USEPA's Robert S. Kerr Environmental Research Center's Mechanical Integrity Testing Facility near Ada, Okla.
Letter of Support to Maurice James from Clark Turner (Director, NPR sites in Colorado, Utah and Wyoming), Jan. 8, 1998.
Letter to Gordon Fassett (Wyoming State Engineer) from Don Lamborn (Environmental Specialist) at the Pittsburg & Midgway Coal Mining Co. (a Chevron Company).
Letter to Maurice James from Jack Daemen (Professor and Chair of Department of Mining Engineering at University of Nevada-Reno), Mar. 22, 1998.
Letter to Maurice James from R. Odell (Consulting Geologist, Minerals Scout of Rocky Mountain Scout), Aug. 22, 1999.
Petro-Plug Project Test Results, RMOTC, Tyler. Jan. 5, 1998.
Predicting Hydraulic Conductivity of Clay Liners, David E. Daniel.
Report of Well Test, Accord Group Inc., Ehlers, Oct. 27, 1997.
"Soft Sell Project Preliminary Results from the Coalinga Abandonment Pilot", Chevron Environmental Management Company.
Technical Note, Accord Group Inc., Ehlers, Oct. 29, 1997.
"Swelling Pressure of Highly Compacted Bentonite", University of Lulea, Div. Of Soil Mechanics, Pusch, R., 1980.
"Preliminary Report on Longevity of Montmorillonite Clay under Repository—Related Conditions," Lund University of Technology, Pusch, R., 1990.
"Permeability, Swelling, and Radionuclide—Retardation Properties of Candidate Backfill Materials," Symposium on Scientific Basis for Nuclear Waste Management, Westsik, J. H., et.al., 1981.
"New Abandonment Technology New Materials and Placement Techniques", Society of Petroleum Engineers #66496, Englehardt, J., et.al., 2001.

"Waste Isolation Pilot Plant Hazardous Waste Permit", U.S. Environmental Protection Agency I.D. Number NM4890139088, Issued to U.S. Department of Energy, 2000.

SUMMARY OF THE INVENTION

An object of this invention is to provide bentonite-based materials which have properties which make them particularly suitable for plugging drill holes. Such materials should have adequate strength and durability to be used in drill hole plugging procedures without unacceptable levels of degradation and breakage.

Another object of this invention is to provide methods for preparing bentonite materials into forms which are useful for plugging wells and drill holes.

Yet another object is to provide such methods for manufacturing formed bentonite materials which are efficient and easily employed on a commercial scale.

An additional object of this invention is to provide methods for plugging wells and drill holes using these formed bentonite materials which methods are reliable when applied to a wide variety of hole depths and configurations and which are effective in a variety of environments.

These and other objects are achieved by a new form of bentonite drill hole plugging material. This material is in the form of compacted nodules and contains bentonite and water as essential ingredients and optionally contains other non-bentonite solids. The bentonite and water are in admixture with the proportion of water to permit the formation of compacted nodules having a mean particle survival at a crush force of at least 800 newtons and an at least 50% survival when dropped 1.5 meters onto a concrete surface. These compacted nodules of bentonite have a specific gravity greater than 2.0. These nodules have rounded contours and typically may be described as pillows, as spheres or as flattened spheres. In one aspect this invention relates to this compacted nodule material.

In another aspect, this invention relates to methods for forming these nodule materials. These are continuous methods and involve
 a. obtaining a feedstock comprising bentonite in admixture with a proportion of water to permit the formation of compacted nodules having a specific gravity greater than 2.0, a mean particle survival at a crush force of at least 800 newtons and at least 50% survival when dropped 1.5 meters onto a concrete surface,
 b. feeding the feedstock under pressure to a continuous roll press machine under conditions to permit the formation of said compacted nodules and
 c. recovering the compacted nodules.

In an additional aspect, this invention provides methods for plugging drill holes. These methods involve introducing a plurality of nodules into the drill hole, the nodules containing bentonite in admixture with a proportion of water to permit the formation of compacted nodules having a mean particle survival at a crush force of at least 800 newtons and at least 50% survival when dropped 1.5 meters onto a concrete surface, and thereafter permitting the feed nodules to come in contact with water in an amount and for a time adequate to cause the nodules to swell and form a substantially hydraulically solid plug in the drill hole. In some of these methods the drill hole is empty and the nodules fall easily and directly to the bottom of the hole. In other methods the drill hole may contain liquids. In the case where the liquid is viscous, it may be advantageous to warm the liquid, or displace the liquid such as by adding hot water, in order to assure that the nodules fall through the viscous liquid to the bottom of the drill hole.

BRIEF DESCRIPTION OF THE DRAWINGS

This invention will be described in more detail with reference to the drawings. In these drawings FIG. 1A is a side view of a representative compacted bentonite nodule of the invention. FIG. 1B is a top view of the same nodule.

FIG. 2A is a side view of a second representative compacted bentonite nodule of the invention. FIG. 2B is a top view of the same nodule.

FIG. 3A is a side view of another representative compacted bentonite nodule of the invention. FIG. 3B is a top view of the same nodule.

FIGS. 5A, 5B and 5C are three not-to-scale cross-sectional views of drill holes plugged with the nodules of this invention.

DESCRIPTION OF PREFERRED EMBODIMENTS

Figure 4:
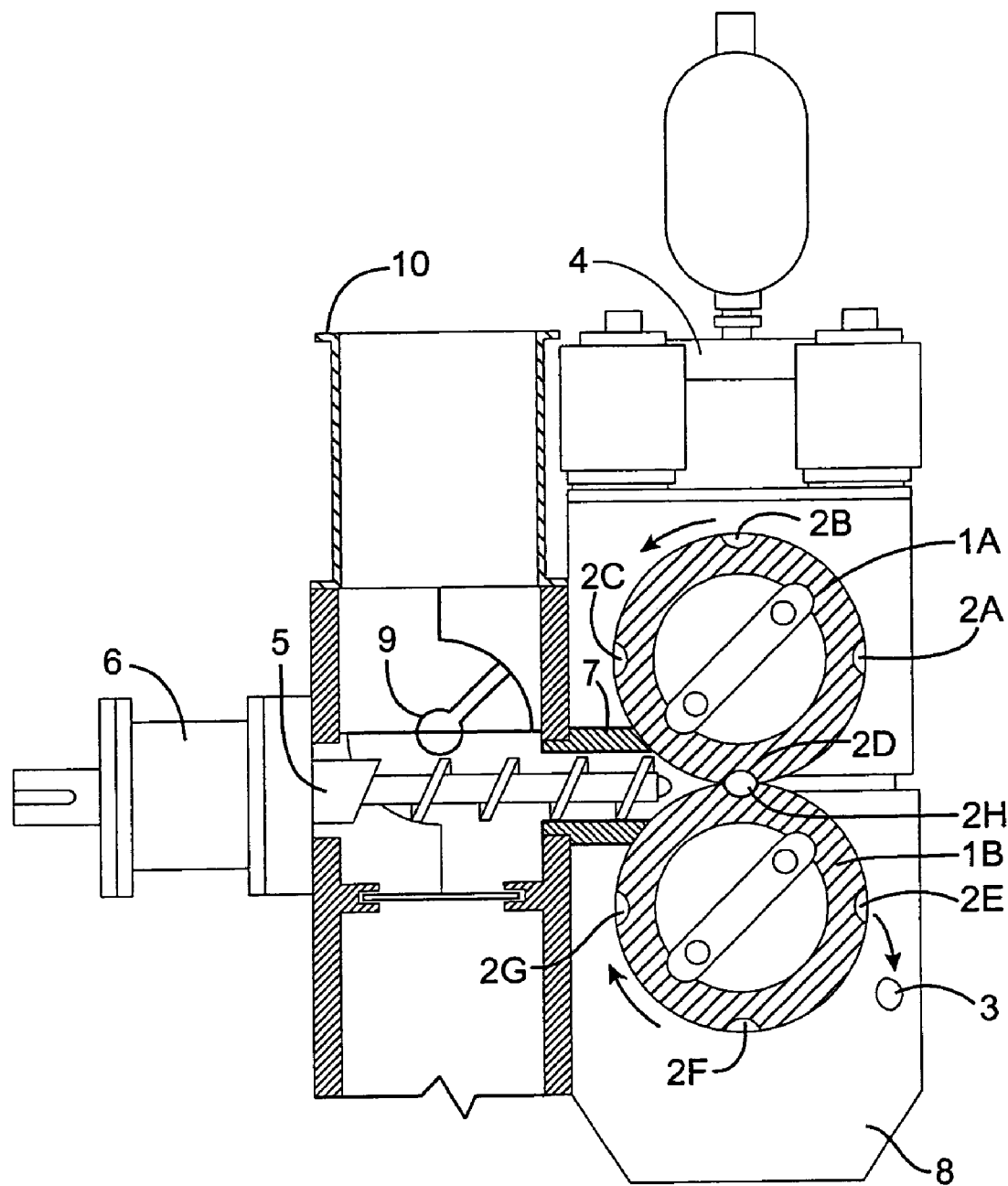
FIG. 4 is a cross-sectional view of a roll pressing apparatus useful in forming the nodules of this invention and useful in practicing the methods of making of this invention.

In accord with this invention, bentonite feedstock is formed into nodules which are useful for plugging drill holes. In this section preferred embodiments of this invention will be described. This section is broken into several subsections as follows:
 The Bentonite Feedstock
 The Nodules
 Process for Preparing
 Process for Plugging Wells The Bentonite Feedstock Bentonite is a naturally-occurring clay containing the clay mineral smectite. It typically also contains accessory minerals such as quartz, mica, feldspar and calcite. Sodium bentonite is a common form of the mineral and is the form used herein. Sodium bentonite is primarily mined in Wyoming. Calcium bentonite is also available and often is intermixed with sodium bentonite in naturally-occurring deposits. Bentonite in which sodium bentonite predominates is preferred.

Naturally-occurring bentonite contains approximately 6–7% by weight connate water. This water is bound into the bentonite and is not easily removable by natural drying. Bentonite includes variable amounts of nonconnate water which is in addition to the connate water. This nonconnate water ranges from 0% by weight of such water up to as much as 15 or 20% by weight based on the total weigh of water plus bentonite. The amount will depend on the conditions of the mineral deposit, how the material is dried after mining, and the humidity and temperature of the environment in which the mineral is stored and used and the like.

In the practice of this invention, the water content of the bentonite is controlled. In describing this controlling, the connate water is not included in water values. Thus, "bentonite" or bentonite having "0%" water", has no additional water added by the manufacturing process but does have the 6–7% of connate water. Bentonite with "7%" water by weight has the 6–7% connate water plus 7% added water for a total of 13–14% water by weight. When the word "bentonite" is used herein without any qualifiers as to water content, it is intended to mean bentonite containing the 6–7% by weight of connate water.

Bentonite is available commercially as a dry material (water content 0%). It has a bulk density when loose of about 1.1 g/cm$^3$. When compacted, its density is higher. Bentonite is also available as an undried or partially dried material having measurable water levels (for example 2–8%). In the present invention bentonite is fed under pressure into a roll pressing apparatus. Accordingly, the bentonite should be substantially devoid of large intractable solids such as rocks or the like. Preferably the bentonite used in this invention passes through an 8 mesh screen.

The bentonite can be used in a substantially pure, as mined, state. It can also be used in admixture with minerals not typically present in natural bentonite such as barite (another clay mineral) or the like. Barite has a higher specific gravity than bentonite and can be added to increase the specific gravity of the resulting nodules. This can assist in speeding the descent of the bentonite nodules to the bottom of a drill hole, particularly in cases where the drill hole contains water or other liquids. These materials are referred to as "nonbentonite" minerals or solids.

Nonmineral materials can be added to the bentonite feedstock to alter the characteristics of either the nodules themselves or the plug that forms when the nodules contact water and swell. These materials are referred to as "additional materials" and have been described in the literature of well drilling and well sealing heretofore and include, for example, wood chips, walnut shells, cellophane strips, nylon chop, wool and the like.

Nonbentonite solids are completely optional components of the feedstocks. Typically they are less than half the total solids. Thus the proportion of nonbentonite solids/bentonite can range from 0/1 to 1/1 and more commonly can range from 0/1 to 0.5/1 by weight.

The feedstock always contains the connate water and may contain additional water above the connate water. The amount of additional water is controlled to provide the desired durable nodules and to permit their production in standard roll press equipment. The amount of additional water, as a weight percentage, based on the weight of added water plus bentonite is from about 2% to about 20%, preferably from about 5% to about 20%, more preferably from about 10% to about 20% and especially 12 to 16%.

Thus, overall feedstock compositions are as follows:

| | |
|---|---|
| Bentonite | 35 to 98% by weight |
| Nonbentonite minerals | 0 to 45% by weight |
| Water (nonconnate) | 2.0 to 20% by weight |
| Preferably, | |
| Bentonite | 45 to 95% by weight |
| Nonbentonite minerals | 0 to 35% by weight |
| Water (nonconnate) | 5 to 20% by weight |
| more preferably, | |
| Bentonite | 50 to 90% by weight |
| Nonbentonite minerals | 0 to 30% by weight |
| Water (nonconnate) | 10 to 20% by weight. |
| and especially, | |
| Bentonite | 64 to 88% by weight |
| Nonbentonite minerals | 0 to 20% by weight |
| Water (nonconnate) | 12 to 16% by weight. |

As noted above, the feedstock can contain additional materials, if desired.

The Nodules

The bentonite-containing feedstock is formed into nodules for use as a well hole-plugging material. As used herein, a "nodule" is defined to be a solid continuous body having substantially its entire exterior surface compacted smoothly into a rounded shape. As shown in FIGS. 1 through 3, the nodules can have a variety of shapes. To achieve efficient use in drill hole plugging operations, it is desirable that the nodules have generally rounded surfaces. This assists in achieving dense packing in the drill hole and tends to minimize bridging in the drill hole. One common shape, a "pillow" shape, is shown in FIGS. 1A and 1B. As can be seen, this shape presents rounded corners and is somewhat squared off in top view. In this nodule the largest cross-sectional dimension is denominated DM and the smallest dimension is denominated Dm. During production of nodules in a roll press, DM is the dimension across the face of a roll press cavity and Dm is the combined "depth" or "thickness" of the two cavity halves.

Another possible nodule shape is substantially spherical. Our results suggest that a true sphere would give excellent down-hole sealing performance. Such a shape is shown in FIGS. 2A and 2B. Again DM is the largest dimension. It is often difficult to get good, complete filling of true spherical nodule-forming cavities in a roll press. Accordingly, for this practical reason, it is preferred to use nodules having a somewhat flattened spherical cross-section. Such an "oval" or "elliptical" cross-section nodule material is shown in FIGS. 3A and 3B. As can be seen from these drawings, the ratio of DM:Dm can range from about 1:1 (as shown in FIG. 2) to about 2:1 or 3:1 as shown in FIGS. 1 and 3. We have had best results in terms of nodule compaction, roll press cavity fill and consistent release from the roll press cavities when the ratio DM:Dm is from about 1.01:1 to about 3:1, preferably about 1.05:1 to about 2.5:1 and especially from about 1.5:1 to about 2.25:1.

The size of the nodules is controlled. When the nodules are to be used as a well plugging material the preferred minimum size for DM is about 7/8". The maximum size for DM depends in part upon the diameter of the drill holes and wells in which the nodules are to be used. Typically, DM should not exceed about 0.67 times the diameter of the drill hole and preferably should not exceed 0.6 times the drill hole diameter. Many common drill holes are from about 5" to about 8" in diameter but some wells can reach 18" or 24" or greater in diameter. Our work has focused on plugging 5" to 8" diameter wells and with the largest nodules we have made, DM has ranged up to about 3 to 4 inches. For this size drill hole, and considering the sizes of cavities which can be easily employed in a roll press, the preferred sizes for DM range from about 1" to about 5", more preferably from about 1.5" to about 4" and especially from about 2" to about 3.5".

While these materials have worked well, one could envisage larger nodules (DM equals up to 6") for use in larger diameter wells.

Many of the advantages of the high strength compacted nodules of this invention are also realized with smaller sizes such as nodules having 1/4" to about 7/8" DM values. These smaller nodules can be used for well plugging as herein described and can also find application in more specialized sealing operations such as sealing or plugging between coaxial casings or anular sealing around joints in a casing string. In these applications, their smaller size can be advantageous.

The nodules of this invention should be durable. If they are fragile an unacceptable proportion of fines and shards will form during normal handling and drill-hole-filling procedures. It has been found that if, on average, the nodules have a mean particle survival at a crush force of at least 800 newtons and can survive at least 50% of all drops of 1.5 meters onto a concrete surface, they will give acceptable performance as a drill hole plugging material. More preferred nodules can withstand 100%, of all 2 meter drops and have a mean particle survival at a crush force of at least about 900 newtons.

The nodules have a controlled high density as a result of the compacting. Their density ranges from about 2.00 g/cm$^3$ to about 2.5 g/cm$^3$ and preferably 2.05 g/cm$^3$ to 2.25 g/cm$^3$. If substantial amounts of "additional materials" were added this could lower the density below 2.0 g/cm$^3$. This would generally not be desirable.

Process for Preparing

The nodules are formed by compressing the feedstock into a forming mold. This can be carried out in a roll press. As shown in FIG. 4, a roll press includes a pair of rolls 1A and 1B which are driven in opposite directions. The clearance between the rolls can be adjusted such as by hydraulic system 4. This can adjust the degree of compaction applied to the feedstock when it is formed into the nodules.

Each of the rolls carries a plurality of cavity halves, such as cavity halves 2a, b, c and d on roll 1a and cavity halves 2e, f, g and h on roll 1B. These cavities are positioned so that as the rolls turn, cavity halves pair up to create a cavity corresponding in shape to the shape of the final nodule. In FIG. 4, cavity halves 2d and 2h are depicted forming such a cavity.

Feedstock is placed in feed hopper 10 and fed to the rotating rolls by screw feeder 5. The feedstock fed via screw drive feeder 5 passes though feed adapter 7 which is designed and sized to direct the proper amount of feed to the cavities as they are being formed. The clearance between the feed, adapter and the rolls and the relative velocity of the screw drive can be varied to adjust the pressure applied to the feedstock during compaction into nodules. 6 is a bearing block for the drive. 9 is a paddle mixer in the feed hopper which assures proper filling of the drive screw. The nodules, such as shown as 3, when formed, are ejected from the rollers and are collected in product chute 8.

The feedstock is compacted under pressure. This is a pressure of at least about 1 MPa, preferably at least about 3 MPa and especially at least about 5 MPa, such as from about 5 MPa to about 20 MPa. The roll press is operated at a speed of from about 2 RPM to about 50 RPM, preferably 3 RPM to about 40 RPM and especially 5 to about 25 RPM being most common.

The roll press will generate substantial heat due to friction resulting during the compaction process. This is usually acceptable and may cause the outer surfaces of the nodules to dry and anneal slightly. If heating becomes excessive, heat can be removed by means not shown.

Process for Plugging Wells

The nodules of this invention are used for plugging wells. A "well" is defined by the United States Environmental Protection Agency to be a hole in the ground that is deeper than it is wide (40 CFR). That definition is used herein, as well.

Representative wells plugged in accord with the invention include drill holes made in connection with oil and gas exploration and extraction including production wells, injectors, seismic holes, and the like. Other representative wells include drill holes and shafts produced in connection with mineral extraction, water production and waste disposal, to name but a representative sample.

In this use, nodules are introduced into the drill hole or other well by pouring or pumping and allowing the nodules to free fall to the bottom of the drill hole. They can be introduced using water-permeable sleeves, copper carriers, and the like. The nodules can be suspended in a fluid such as water or a mud, such as a bentonite-containing abandonment mud and injected to the desired location using pumps or the like.

In one application, the bentonite nodules can be placed over the entire length of a well, substantially filling it and providing a bentonite plug over the entire length of the drill hole.

As illustrated in FIG. 5A, in another application, the bentonite nodules can be placed at the top and bottom of a drill hole or other well. A nonbentonite material can be used between the two layers of nodules to support the top layer until it swells.

As illustrated in FIGS. 5B and 5C, in other applications the bentonite nodules can be placed at the top and bottom of a drill hole and at other locations in the drill hole to achieve plugs between various formations or layers.

When using the compressed bentonite nodules of this invention to plug drill holes it sometimes happens that a layer of higher viscosity liquid is present in the drill hole or other well. This is most commonly a layer of crude oil floating upon a layer of water in the drill hole. In this case, the viscous oil layer may provide resistance to the nodules or other solids, such as gravel, and prevent them from easily falling to the bottom of the drill hole. The bentonite nodules detained by the oil layer can pick up water, swell and bridge the drill hole at an inappropriate depth. Adding heat to the drill hole prior to adding the bentonite nodules can be helpful in solving this problem as the heat reduces the viscosity of the oil layer and decreases the likelihood that the nodules will be held up for a long period in the oil layer.

Heat may be added in any manner. This could include passing a flow of steam or hot gas into the oil layer. However, most drill hole plugging operations take place in settings where drill holes are being abandoned. Thus the drill hole typically does not have pipes or other means for delivering steam or hot gas to the oil layer. In addition, there is often no equipment on site for producing steam or hot gas. In these settings, however, it is often possible to obtain hot water. Hot water can simply be poured into the drill hole to warm the oil layer.

In a drill hole setting, hot water is most commonly from about 115 to about 180° F. and more typically from 125 to 175° F. and especially 130 to 150° F. One can add from about 1 to 10 barrels of hot water to a drill hole while larger amounts of up to about 100 barrels can also be used if desired.

The amount of heating is often varied to suit the particular circumstances of a particular drill hole. A large excess of heating is typically not the answer as it takes extra time and involves unneeded expense. In addition, it also can lead to conditions where an unnecessarily elevated temperature causes the bentonite to expand too rapidly when a bentonite nodule is traversing the oil layer which can in turn lead to undesired bridging of the drill hole.

Another factor to consider when using nodules of bentonite to plug a well is the salinity of any water in the well. In many cases salinity will not be a limitation but if the water is highly saline, in some cases the nodules may exfoliate and break up. The hydration still takes place but the nodules have been granulated and the plug produced will likely have less density and therefore higher permeability than desired for the purpose of well plugging. This problem can be solved for different salinities by varying the water saturation in the nodules themselves, by slightly pre-hydrating the nodules prior to well placement or alternatively by diluting the salinity of the water in the well bore during placement of the nodules. Compacted nodules of this invention were tested at three levels of salinity—fresh water, sea water (19,000–23,000 mg/L chlorides) and saturated brine (189,000 mg/L chlorides). The compacted nodules exhibited markedly different characteristics than are typically observed with non-compacted materials. Compacted nodules containing about 16% by weight nonconnate water gave good results and exhibited only minor exfoliation and break down.

In all cases, the bentonite nodules swell when contacted with additional water and form a hydraulically solid plug of expanded bentonite containing about 38% by weight water.

EXAMPLES

The invention will be further illustrated by the following examples. These are provided to demonstrate the practice of this invention and are not to be construed as limitations on the invention which is defined by the claims. The examples were conducted and recorded in a format used previously for briquet making. The report description therefore at times labels the nodules as "briquets". Some of the data were recorded in international system of units while other data were recorded in English units. Conversions between these units can be carried out using factors taken from the following conversion table.

| CONVERSION TABLE INTERNATIONAL SYSTEM OF UNITS (SI) TO ENGLISH UNITS | |
|---|---|
| 1 [mm] | 0.03937 [in] |
| 1 [g/cm$^3$] | 62.42000 [lb/ft$^3$] |
| 1 [t] | 2,204.60000 [lb] |
| 1 [t/h] | 2,204.60000 [lb/h] |
| 1 [N] | 0.22480 [lb] |
| 1 [MN] | 224,809.00000 [lb] |
| 1 [MN/m] | 5,710.16000 [lb/in] |
| 1 [MPa] | 145.03800 [PSI] |
| 1 [kW] | 1.34100 [HP] |

Example 1

K. R. Komarek model B100R, B220QC and B400A roller presses were used in all trials. FIG. 4 shows schematically the cross section of these machines. Feedstock material from the feed hopper was supplied into the roll nip with a horizontal screw, driven by a variable speed drive unit. A paddle mixer was utilized to agitate feedstock material into the horizontal screw at the feed inlet.

The material was then compacted between two rolls which are cantilevered on the ends of shafts outside the bearing blocks. A fully adjustable hydraulic system provides the force holding the rolls together. This force is equal in magnitude to the roll-separating force generated by the compacted material in the roll nip. A gas-filled accumulator in the hydraulic system acts as a pressured reservoir. Accumulator pre-charge pressure determines the hydraulic system stiffness.

Feedstocks described in Table 1, made up of bentonite with various water contents, were placed into the feed hopper. The roll-pressing process was then tested. After the roll press was operating under stable conditions, all the data were collected. These data presented in Table 2. The properties of the nodules produced in the tests are listed in Table 3.

Two methods were used to compare nodule strength:

A. Crushing Strength.

The nodule was placed between two parallel plates and loaded until failure. Nodule strength is expressed as the maximum force the nodule resists before failing.

B. Drop Strength.

The nodule was dropped on the concrete floor. Drop strength was defined as the height of drop at which more than 50% of nodules start to break because of impact. If the drop strength was over 2.0 m, the number of drops from 2.0 m was additionally recorded.

The nodules were flattened spheres shaped as shown in FIG. 3 with DM=2.97" and Dm=1.5".

As can be seen from the product data given in Table 3, the nodules are compacted and durable.

Example 2

A series of nodule preparation runs were conducted on a Komarek B 400B roll press machine. The nodule size was 2¾ inches by 1¾ inches.

The roll clearance was 0.060". A variety of bentonite feedstocks varying in water content was employed.

One first set of 9 runs was made with dry bentonite (essentially no added water).

The initial run was made with the hydraulic pressure set at 1100 psi and the rolls and feed screw run at 58 RPM and 25 RPM, respectively. The indicated pressure shot up beyond 2000 psi. The action appeared to be stiff.

Another initial run was made with the feed screw slowed down to 15 RPM. This was done in case the 1100 psi machine setting was sufficient. In both initial runs, nodules were formed, although they were unacceptable as they were being crushed and split during production.

Because of these results, the hydraulic pressure was decreased to 700 psi, the roll was kept at a full 60 RPM and the feed screw slowed down to 10 RPM. Nodules were produced at first, but they were not well formed and still appeared to be crushed and brittle.

Run 2 was performed with the roll drive at a full capacity of 60 RPM. The feed screw was run at 13 RPM but the nodule quality did not significantly improve.

Feed screw speed was slowed to 11 RPM and the roll speed slowed to 58 RPM as well. Hydraulic pressure was set to 600 psi. Nodule quality was slightly better.

In the next run, the pressure was increased to 700 psi with all other conditions being the same. The needle on the gauge showed a more controlled response, and the nodule quality was the best thus far, although not particularly strong.

In order to determine the range of pressure under different conditions, the next run was done at 850 psi with the same roll speed and a slightly faster feed screw (13 RPM). The machine became very sensitive. Thus, the next run was made with the same conditions but with the pressure dropped to 600 psi. The nodule quality was improved.

Another run was made to determine the bottom range of the feed screw at a lower pressure. At 500 psi, with the feed screw at 11 RPM and the rolls at 58 RPM, quality nodules were made. They were slightly rough about the edges, but otherwise they were aligned.

Run 8 was done in the same way with the rolls run at maximum. The nodules were as good as in the previous run.

Given the above data, it appears that the optimal pressure range for the machine is between 500 and 600 psi. 700 psi is possible. The rolls can be run as high as 58–60 RPM under these conditions, but the feed screw must be run at a slow 11 RPM with a maximum of 13 RPM before the machine becomes very sensitive.

Just to re-verify the pressure, a small run was done from with the optimal feed and roll speeds but at 400 psi pressure. The nodules were still of good quality, but not as good as the runs that determined the optimal conditions.

Hence, when the conditions are optimal, the nodules are very strong, of excellent quality, and the needle on the hydraulic pressure shows very slight deviations from its set pressure indicating a good spring effect.

Further runs were performed in order to fully exploit the range of quality nodules. The previous nodule, particularly of run 5 at 0% moisture, was a good nodule, so it was to be determined if a higher quality nodule was possible.

In the next series of runs, the feedstock was changed. A bentonite material of 7% moisture was used. The bentonite with this added moisture showed improved roll pressing. It was also found that the material was easily briquetted in general, requiring less hydraulic pressure than with dry material. In order to verify this, the pressure was kept at 300–400 psi for each run. The response in the pressure readings was much more favorable than had previously been observed. In addition, the nodules were showing improved quality, with excellent strength. Almost all nodules survived 2 meter drop tests, and a good number survived drops of as much as 5 meters.

Though these nodules were quite good, there still seemed to be a lot of sensitivity in the hydraulic pressure responses in the roll pressing, and when the 7% moisture material was depleted, 14% moisture feedstock material was used to focus on the pressure response and motor speeds.

With 14% moisture content, it was seen that the nodules showed immediate improvements in roll pressing from just the moisture alone. The moisture content of 14% seemed to be quite ideal. For the first few runs, the pressure was lowered to 300 psi in an attempt to improve the surface quality by eliminating cracks and clam shelling from too high pressures, and the motors were run to compensate and improve strength. The third 14% moisture run showed a well-developed nodule.

A continuous, steady production run was also sought. The next few runs were made not only to meet these objectives, but to get a better determination as to the range of speeds available. A lower pressure was found to work quite well, and this is beneficial as it extends the roll life of the machine. Fuller nodules were made with the correct feed of material from the feed screw. The rolls had the most range of operation available to them, being able to run in a bit slower, or even at full capacity.

With each run, the nodules would improve but the belts were apt to slip. After correcting with the pressure and the feed screw speed, the optimal running conditions were narrowed down and locked into a specific range. The nodules had improved so much that they were of the utmost in strength, quality and appearance for this size. This good product quality was present during a continual and lengthy run.

The results for all of the above trials are in Table 4. It has been shown that the higher amount of moisture (14%) is very beneficial to high quality manufacturing. Best results were obtained with the following conditions.

With 14% moisture:
Hydraulic pressure: 250 psi
Roll Cycles/Load: 58–60 RPM
Screw cycles/Load: 12–13 RPM
With 7% moisture:
Hydraulic pressure: 300 psi
Roll Cycles/Load: 52–54 RPM
Screw cycles/Load: 11 RPM
With 0% moisture:
Hydraulic pressure: 500–600 psi
Roll Cycles/Load: 58–60 RPM
Screw cycles/Load: 11 RPM
(If material flow is good and consistent from the feed inlet, 700 psi and 13 RPM on the screw is possible.)

Example 3

The nodules formed as a result of the knowledge gained from Examples 1 and 2 were evaluated in the laboratory and in the field.

Laboratory Tests

Test No. 1

The effect of salinity on compressed bentonite nodules' ability to form a hydraulically solid plug was evaluated. Nodules containing about 16% by weight nonconnate water were used.

Test Methodology: Freshwater

Nodules were placed in a mason jar, covered with freshwater, and the jar was closed with a lid. On visual inspection, within 12 hours the nodules had hydrated to form a solid plug and consumed the water in the jar.

Test Methodology: Seawater

A sample of Gulf of Mexico seawater (19,000–23,000 mg/L chlorides) was used. Nodules were placed in a jar, covered with seawater, and the jar was closed. Within a few minutes some of the bentonite was observed flaking off of the nodules. Twelve hours later, the nodules had formed a hydraulically solid plug and consumed the water in the jar.

Test Methodology: Saturated Sodium Chloride

A sample of saturated sodium chloride brine (189,000 mg/L chlorides) was used in the same test. Within a few minutes, some of the bentonite was observed flaking off of the nodules. Twelve hours later, the nodules had formed a hydraulically solid plug and consumed the water in the jar.

This showed that in most cases there may be no salinity limit on the ability of compressed sodium bentonite nodules to form a hydraulically solid plug. However, extremely high salinity levels may lead to some desiccation and exfoliation of the bentonite nodules. This can occur as the nodules fall through a layer of extremely saline water.

Test No. 2

This test was to determine what happens to a compressed sodium bentonite nodule-based plug that has been hydrated in freshwater and then is placed in a saline water environment.

Test Methodology: Saltwater Bath of Freshwater Plug

A wire mesh container for the nodules was fashioned to allow for observation of the plug from all sides. Nodules were placed in the container and immersed in freshwater and allowed to hydrate overnight. A solution of saturated salt water (189,000 ppm chlorides) was prepared. The wire mesh container was removed from the freshwater and immersed in the saltwater bath. The salinity of the saltwater solution was periodically measured based on its conductivity. Although initially there was a slight decrease in conductivity of the saltwater, the salinity recovered and stabilized. The plug continued to hydrate. No shrinkage was observed, and no deterioration of the plug was observed. The test ran for over 60 days.

This test shows that desiccation does not take place in a presaturated fresh water condition.

Test No. 3

The test was to determine whether the nodules will be washed away by water running through an unhydrated plug.

Test Methodology: Bentonite Washout

A clear plastic container with holes in the bottom was filled with compressed bentonite nodules. Water was continuously run through the container. The run-off solution was inspected of bentonite particles. Within 3 hours, the bentonite had hydrated sufficiently to retard the flow to negligible amounts. The container became deformed due to the swelling of the nodules as they hydrated. There was a minor clouding of the water utilized for the experiment. This indicated that washout would not be a problem.

Test No. 4

A test was conducted to determine whether an oil coating and an oily water environment would inhibit hydration of the compressed bentonite nodule.

Test Methodology: Hydration in Oily Environments

A jar was filled with oily produced water, 19° API, with a free oil layer that was thicker than one nodule. Nodules were individually dropped through the oil layer into the jar. Twelve hours later the nodules had formed a hydraulically solid plug. The only liquid remaining in the jar was free oil. All of the water was consumed by the nodules. The presence of oil or oil coating of the nodule did not affect the hydration rate since there was access to water.

Test No. 5

The effect of steam flow created prior to complete hydration of a compressed sodium bentonite plug was studied to determine if the steam will prevent sealing of the open flow paths.

Test Methodology: Hydration in Steam Environments

A mason jar was layered with pea gravel, bentonite nodules and more pea gravel. 200° F. freshwater was placed in the jar. The jar was heated, producing boiling water and steam escaping through a preferential flow path. Within two hours, the open flow paths were observed to have sealed due to hydration of the bentonite. The experiment was suspended. The test jar was set aside. Two days later, observation of the jar suggested that swelling pressure had broken the jar, but the gravel and the bentonite had formed a solid plug. The steam and boiling agitation had distributed bentonite particles throughout the gravel pore spaces. Preferential flow paths did not remain open during the experiment due to hydration.

Test No. 6

The effect of hydrogen sulfide on bentonite hydration was examined.

Test Methodology: Hydration in $H_2S$ Environment

A nodule was immersed in a jar of freshwater while at the same time another nodule was placed in a jar of saturated hydrogen sulfide water. Both nodules hydrated. By visual inspection, the nodule in the hydrogen sulfide water swelled about 70 percent as much as the nodule in freshwater. This showed that bentonite will hydrate in saturated hydrogen sulfide water. However, bentonite swelling capacity appears to be affected by the presence of $H_2S$.

Field Tests

Three generalized drill hole plugging designs were tested. The three designs were dependent upon the presence of freshwater and the calculated top of cement. The principle utilized in the design was to restore well bore flowpaths to their preexisting states. In short, where clay once resided, place clay; where porous and permeable formations exist, place like material, including intervals across perforations. This, in effect, would return the material from whence it came. As will be described below, the plug was to be 110 feet in total length.

FIG. 5 depicts the three design schematics.

Case 1—No Freshwater Present

As shown in FIG. 5A, a plugged well 20 is made up of a cement well casing 22 extending from the topmost perforation 24 of producing zone 26 to the surface 28. Alternatively, the well casing 22 could extend from a water shut off or from a linear top (whatever is highest) to the surface 28.

This plugging called for the isolation of the producing zone 26 from the surface through the placement of a 110 ft. zonal plug 30. In addition to the zonal plug, a 25 ft. surface plug 32 was placed.

To ensure that the bentonite plug 30 provided an effective seal around the liner top, it was decided to extend the bottom of the zonal plug 30 by ten feet, penetrating the liner, if present, and, at times, reaching below the topmost perforations or water shut-off. This ten foot extension is identified as 34. Using the same logic, the surface plug was also extended an additional twenty-five feet as shown at 36 to ensure isolation.

The space between plugs 30 and 32 was filled with gravel 38.

Of the nineteen wells plugged in the field test, eleven were of the Case 1 design.

Case 2—Freshwater Present. Cement in Annulus Above Freshwater Interface

As shown in plugged well 40 in FIG. 5B, when freshwater is present, such as at level 42, an operator is required to protect it from potential contamination from both the producing zone 26 and the surface 28. Although the annulus at and near the freshwater interface 42 is protected from corrosive formation waters by a sheath of cement 22, in a Case 2 well, should the integrity of this sheath fail, the potential for freshwater contamination is great. Therefore, in addition to the producing zone plug 30 and the surface plug 32, an operator is also required to place a 100 ft. plug 44 across the freshwater interface 42. By design, this plug should effectively shut off the possibility for communication from both above and below. Gravel fills regions 38 and 46.

There were four pilot wells of the Case 2 design which were plugged.

Case 3—Freshwater Present. Cement Top in Annulus Below Freshwater Interface

As shown in FIG. 5C, the bentonite nodules can also be used to plug wells such as well 60 where the concrete annulus 22 does not extend all the way to the surface 28 and in which freshwater 42 may be found in the region between the top of the concrete annulus and the surface. In this case, producing plug 38 and surface plug 32 are substantially as shown in FIGS. 5A and 5B.

It was proposed to fire a cavity shot at the base of freshwater 42, and subsequently fill the hole and cavity 46 created by the cavity shot with bentonite nodules. Cavity shots are currently the required method when more than one string of casing is present at the base of freshwater.

The abandonment would be completed in two phases, the initial producing zone plug 30, then the cavity shot (with a rat-hole providing for the encasing of debris within bentonite) and the freshwater plug 46 and the surface plug 32.

There were four wells plugged utilizing the cavity shot technique (Case 3).

Field Results

Plugging of nineteen wells within a Coalinga, California oil field was completed utilizing compressed, preformed bentonite nodules, which serve as a permanent clay barrier to fluid migration within the well bore. The following section details the execution at the field level, and the results obtained. The results are summarized in Table 5, as well.

Implementation

Bentonite nodules were to be used in lieu of cement, with gravel used as fill material. One of the benefits of the bentonite process over conventional cement abandonments is the lack of need for customary cement pump trucks, coiled tubing units and bulk cement units. In order to accomplish the objectives, the pilot wells were divided into two discrete subsets: the first ten wells where placement success was considered the highest objective; and the second nine wells where the focus was directed towards process efficiency. The results of the pluggings are summarized below and in the Table 5.

Pilot Learnings

Nineteen wells in the Coalinga Oil Field were plugged using compressed bentonite nodules. Eleven of the wells were of the Case 1 design, while the remaining eight were equally split between Case 2 and Case 3.

The densely compacted bentonite nodules fell through the first ten wells attempted (predominantly primary producers) without incident. The bentonite was placed into the wells utilizing a chute and funnel at a rate of about one forty pound box per minute. The bottom plug 30 was typically placed by pouring the bentonite dry, without the presence of water, from surface and allowing it to hit the air/liquid interface, which was approximately 1,000 feet below ground level. The nodules consistently penetrated the interface without bridging and fell through the liquid column to the desired depth.

Upon witnessing the placement of the plug 30, water was then added, if needed, to hydrate the plug. It should be noted that proper plug hydration was ensured and verified through the sampling of formation liquids prior to material placement to ascertain adequate water cuts, and the sustained presence of standing water upon execution of subsequent stages within a given well's abandonment.

Pea gravel and larger sized gravel (¾"-minus) 38 was used in the pilot. The larger sized gravel was preferred as it more closely approximated the size and density of the bentonite nodules.

The temperature and timing of water placed in the well also varied during the plugging of the first ten wells. This had a pronounced effect on bridging, as is discussed below.

Subset No. 1: First Ten Wells

Two means of placing bentonite and gravel were explored during the plugging of the first ten wells: dry pouring, and pouring into a column of liquid. Initially, material was poured into the well and water added after the proper bentonite depth was verified. Since the pea gravel and the ¾"-minus gravel both were observed to bridge occasionally while free-falling several hundred feet to the air/liquid interface, it was decided to fill the entire well bore with water to minimize these events. This did result in the elimination of gravel bridging, but also decreased the application rate at the surface, and increased the settling time downhole considerably. There was, however, a net improvement when considering the downtime caused by bridging.

In addition, the temperature of the hydrating water was also varied in an attempt to reduce the viscosity of the heavy oil, especially at the fluid interface. The combined effect of wellborn fill-up, with hot water (approximately 130° F.), a process derived by the end of the first ten wells, appeared to have solved the placement and bridging issues.

The addition of hot produced water preceding the introduction of abandonment materials and between the alternating stages of bentonite and gravel also improved efficiency by reducing the number of gravel bridge-offs.

Subset No. 2: Last Nine Wells

The focus of the last nine wells was to improve the placement rate of gravel and bentonite nodules. The first ten wells identified a need for water during gravel placement, coupled with the realization that hot water would reduce the fluid viscosity at the interface. Therefore, it was decided to fill the wells partially with hot water upon the commencement of abandonment work. Prior to adding gravel and bentonite, the wells were treated with a minimum of one casing volume of hot water.

This modification resulted in the elimination of gravel bridging. Unfortunately, after placing the first bentonite plug, the slickline unit indicated that the bentonite had bridged high. This was the first occasion in which the bentonite had not fallen to its intended depth without incident. Unsure of the cause, and suspecting some characteristic particular to this well alone (perhaps the higher gravity crude oil present), the operations crew proceeded to bridge two additional wells with bentonite utilizing the same new technique, hot water with bentonite.

It was at this time that the effects of heat on bentonite hydration were fully understood at the field level. Prior use of hot water in the first ten wells was used after placing bentonite and before pouring gravel. Now, hot water was constantly being added to the well with no opportunity for downhole cooling to occur prior to the addition of bentonite.

The predicament for operations was the need for hot water to assist in viscosity reduction for the gravel's sake, and the need for cool water to ensure effective placement of bentonite. The solution obtained was to allow the bentonite to free-fall as much as possible in the well bore to reduce settling time and achieve a high confidence level of it reaching its objective depth. Once there, and verified with a slickline tag, hot water could be trickled into the well while gravel was poured. The water then served to hydrate the bentonite and prevent gravel bridges.

As a further means of optimization, the trickling of the hot water into the well was stopped prior to the end of the gravel stage. This served to cool the water before the introduction of bentonite.

The modified placement technique made for an efficient and effective plug. In every case, the bottom plug hydrated fully, as evidenced by standing columns of fluid at the surface before the plugging was even completed. As a result, subsurface plugging time was reduced.

Additionally, a core was taken of the surface plug of a well for the purpose of obtaining its permeability. The core was taken at a depth of approximately eleven feet from the surface after the conductor and surface casing were cut-off. Upon removing the casing, a hydraulically solid plug was exposed from which the core sample was obtained. Tests indicated that the plug had an air permeability of less than 0.1 (less than the lowest measurement the apparatus can obtain), a water permeability of 0.0014 and a hydraulic conductivity of 1.44×10-9 cm/s.

TABLE NO. 1

FEED MATERIAL PROPERTIES DATA SHEET - BATCH 1.

| | | | |
|---|---|---|---|
| CHEMICAL NAME | | BENTONITE | |
| MOLECULAR FORMULA | | SAMPLE MARKED "BH#4" | |
| MOISTURE CONTENT | % | 18.5 | |
| TRUE DENSITY | $g/cm^3$ | | |
| BULK DENSITY (LOOSE) | $g/cm^3$ | 1.11 | |
| BULK DENSITY (PACKED) | $g/cm^3$ | 1.24 | |
| HARDINESS | MOHS SCALE | | |
| ANGLE OF REPOSE | deg | NOT MEASURED | |
| ANGLE OF FALL | deg | | |
| ANGLE OF DIFFERENCE | deg | | |
| OTHER | | | |

MATERIAL RETAINED ON SIEVE

| MESH | MICRONS | MASS g | MASS FRACTION % | MASS ACCUMUL % |
|---|---|---|---|---|
| 8 | 2380 | 7.4 | 2.7 | 2.7 |
| 18 | 1000 | 63.2 | 23.5 | 26.2 |
| 35 | 500 | 68.1 | 25.3 | 51.5 |
| 70 | 210 | 62.4 | 23.2 | 74.7 |
| 140 | 105 | 39.2 | 14.6 | 89.2 |
| 200 | 74 | 14.1 | 5.2 | 94.5 |
| 325 | 44 | 0.7 | 0.3 | 94.7 |
| PAN | #N/A | 14.2 | 5.3 | 100.0 |

FEED MATERIAL PROPERTIES DATA SHEET - BATCH 2.

| | | | |
|---|---|---|---|
| CHEMICAL NAME | | BENTONITE | |
| MOLECULAR FORMULA | | SAMPLE MARKED "12-40" | |
| MOISTURE CONTENT | % | 10.2 | |
| TRUE DENSITY | $g/cm^3$ | | |
| BULK DENSITY (LOOSE) | $g/cm^3$ | 1.09 | |
| BULK DENSITY (PACKED) | $g/cm^3$ | 1.18 | |
| HARDINESS | MOHS SCALE | | |
| ANGLE OF REPOSE | deg | NOT MEASURED | |
| ANGLE OF FALL | deg | | |
| ANGLE OF DIFFERENCE | deg | | |
| OTHER | | | |

MATERIAL RETAINED ON SIEVE

| MESH | MICRONS | MASS g | MASS FRACTION % | MASS ACCUMUL % |
|---|---|---|---|---|
| 8 | 2380 | 5.2 | 1.7 | 1.7 |
| 18 | 1000 | 110.8 | 36.0 | 37.7 |
| 35 | 500 | 135.4 | 43.9 | 81.6 |
| 70 | 210 | 55.8 | 18.1 | 99.7 |
| 140 | 105 | 0.4 | 0.1 | 99.8 |
| 200 | 74 | 0.2 | 0.1 | 99.9 |
| 325 | 44 | 0 | 0.0 | 99.9 |
| PAN | #N/A | 0.3 | 0.1 | 100.0 |

FEED MATERIAL PROPERTIES DATA SHEET - BATCH 3.

| | | | |
|---|---|---|---|
| CHEMICAL NAME | | BENTONITE | |
| MOLECULAR FORMULA | | SAMPLE MARKED "GRAN. FINES" | |
| MOISTURE CONTENT | % | 9.1 | |
| TRUE DENSITY | $g/cm^3$ | | |
| BULK DENSITY (LOOSE) | $g/cm^3$ | 1.16 | |
| BULK DENSITY (PACKED) | $g/cm^3$ | 1.28 | |
| HARDINESS | MOHS SCALE | | |
| ANGLE OF REPOSE | deg | NOT MEASURED | |
| ANGLE OF FALL | deg | | |
| ANGLE OF DIFFERENCE | deg | | |
| OTHER | | | |

TABLE NO. 1-continued

MATERIAL RETAINED ON SIEVE

| MESH | MICRONS | MASS g | MASS FRACTION % | MASS ACCUMUL % |
|---|---|---|---|---|
| 8 | 2380 | 0.4 | 0.1 | 0.1 |
| 18 | 1000 | 1.5 | 0.5 | 0.6 |
| 35 | 500 | 3.8 | 1.2 | 1.7 |
| 70 | 210 | 151.0 | 45.8 | 47.6 |
| 140 | 105 | 84.5 | 25.6 | 73.2 |
| 200 | 74 | 26.3 | 8.0 | 81.2 |
| 325 | 44 | 27.1 | 8.2 | 89.4 |
| PAN | #N/A | 34.9 | 10.6 | 100.0 |

FEED MATERIAL PROPERTIES DATA SHEET - BATCH 4.

| | | | |
|---|---|---|---|
| CHEMICAL NAME | | BENTONITE | |
| MOLECULAR FORMULA | | SAMPLE MARKED - LAST SHIPMENT | |
| MOISTURE CONTENT | % | 20.2 | |
| TRUE DENSITY | $g/cm^3$ | | |
| BULK DENSITY (LOOSE) | $g/cm^3$ | 1.03 | |
| BULK DENSITY (PACKED) | $g/cm^3$ | 1.16 | |
| HARDINESS | MOHS SCALE | | |
| ANGLE OF REPOSE | deg | NOT MEASURED | |
| ANGLE OF FALL | deg | | |
| ANGLE OF DIFFERENCE | deg | | |
| OTHER | | | |

MATERIAL RETAINED ON SIEVE

| MESH | MICRONS | MASS g | MASS FRACTION % | MASS ACCUMUL % |
|---|---|---|---|---|
| 8 | 2380 | 35.2 | 9.1 | 9.1 |
| 18 | 1000 | 48.5 | 12.5 | 21.7 |
| 35 | 500 | 82.3 | 21.3 | 42.9 |
| 70 | 210 | 159.1 | 41.2 | 84.1 |
| 140 | 105 | 33.9 | 8.8 | 92.9 |
| 200 | 74 | 24.5 | 6.3 | 99.2 |
| 325 | 44 | 0.9 | 0.2 | 99.5 |
| PAN | #N/A | 2.1 | 0.5 | 100.0 |

TABLE NO. 2

Roll Press Set Up, Test Conditions and Process Characteristics

| | | RUN NO. 1 | RUN NO. 2 | RUN NO. 3 | RUN NO. 4 | RUN NO. 5 | RUN NO. 6 | RUN NO. 7 | RUN NO. 8 |
|---|---|---|---|---|---|---|---|---|---|
| TESTED MATERIAL | | BATCH 1 | BATCH 1 | BATCH 1 | BATCH 1 | BATCH 1 | BATCH 2 | BATCH 2 | BATCH 2 |
| FEED MATERIAL BULK DENSITY | g/cm$^3$ | 1.11 | 1.11 | 1.11 | 1.11 | 1.11 | 1.09 | 1.09 | 1.09 |
| MACHINE MODEL | | B-220QC | B-220QC | B-220QC | B-220QC | B-220QC | B-220QC | B-220QC | B-220QC |
| ROLLS PART NO. | | B2487 | B2487 | B2487 | B2487 | B2487 | B2487 | B2487 | B2487 |
| ROLL DIAMETER | mm | 305 | 305 | 305 | 305 | 305 | 305 | 305 | 305 |
| NO. OF POCKETS (CORRUGATIONS) | | 24 | 24 | 24 | 24 | 24 | 24 | 24 | 24 |
| NO. OF ROWS | | 1 | 1 | 1 | 1 | 1 | 1 | 1 | 1 |
| ROLL FACE WIDTH | mm | 76 | 76 | 76 | 76 | 76 | 76 | 76 | 76 |
| ROLL SPEED | rev/min | 3.0 | 3.0 | 3.0 | 3.0 | 14.7 | 12.4 | 3.0 | 3.0 |
| ROLL TORQUE | Nm | 3672 | 3815 | 3037 | 2736 | 2689 | 2915 | 3029 | 3910 |
| ROLL DRIVE POWER INDEX | kW | 1.16 | 1.20 | 0.96 | 0.86 | 4.15 | 3.80 | 0.95 | 1.23 |
| FEED SCREW PART NO. | | | | | | | | | |
| FEED SCREW OUTSIDE DIA | mm | 73 | 63 | 63 | 63 | 63 | 63 | 63 | 63 |
| FEED SCREW ROOT DIA | mm | 41 | 35 | 35 | 35 | 35 | 35 | 35 | 35 |
| FEED SCREW PITCH | mm | 51 | 51 | 51 | 51 | 51 | 51 | 51 | 51 |
| SCREW BARREL INSIDE DIA | mm | 76 | 76 | 76 | 76 | 76 | 76 | 76 | 76 |
| FEEDSCREWSPEED | rev/min | 31 | 58 | 52 | 49 | 391 | 391 | 82 | 91 |
| SCREW TORQUE | Nm | 284 | 158 | 123 | 115 | 78.5 | 45 | 43 | 53 |
| FEED SCREW DRIVE POWER IND | kW | 0.92 | 0.96 | 0.67 | 0.59 | 3.22 | 1.85 | 0.37 | 0.51 |
| PRESSURE IN HYDRAULIC SYS | MPa | | | | | | | | |
| INITIAL ACCUMULATOR PRESSURE | MPa | 6.89 | 6.89 | 6.89 | 6.89 | 6.89 | 6.89 | 6.89 | 6.89 |
| ROLL SEPARATING FORCE | MN | 0.184 | 0.187 | 0.122 | 0.069 | 0.057 | 0.096 | 0.105 | 0.141 |
| INITIAL ROLL GAP | mm | 0.4 | 0.4 | 0.4 | 0.4 | 0.4 | 0.4 | 0.4 | 0.4 |
| WEB THICKNESS | mm | 0.7 | 0.9 | 1.2 | 2.3 | 2.9 | 3.1 | 2.6 | 2.1 |
| BRIQUET CALCULATED PRESSURE | MPa | 60.64 | 61.63 | 40.21 | 22.74 | 18.79 | 31.64 | 34.60 | 46.47 |
| RATIO OF TANGENTIAL TO RADIAL STRESS | | 0.13 | 0.13 | 0.16 | 0.26 | 0.31 | 0.20 | 0.19 | 0.18 |
| MEASURED THROUGHPUT | t/h | 0.2642 | 0.2609 | 0.2731 | 0.2945 | 1.5382 | 1.3472 | 0.3127 | 0.3207 |
| BRIQUET TEMPERATURE | DEG.C | NOT MEAS | NOT MEAS | NOT MEAS | NOT MEAS | NOT MEAS | NOT MEAS | NOT MEAS | NOT MEAS |
| BRIQUET WEIGHT | g | 57.91 | 57.61 | 59.48 | 63.51 | 66.25 | 67.52 | 66.45 | 69.65 |
| BRIQUET NET PRODUCTION RATE | t/h | 0.2502 | 0.2489 | 0.2570 | 0.2744 | 1.4024 | 1.2056 | 0.2871 | 0.3009 |
| FINES PERCENTAGE | % | 5.3 | 4.6 | 5.9 | 6.8 | 8.8 | 10.5 | 8.2 | 6.2 |
| FEED SCREW EFFICIENCY | % | 87.6 | 61.5 | 71.7 | 82.1 | 53.7 | 47.2 | 53.1 | 49.0 |
| ROLL DRIVE ENERGY CONS. | kWh/t | 4.4 | 4.6 | 3.5 | 2.9 | 2.7 | 2.8 | 3.1 | 3.8 |
| SCREW DRIVE ENERGY CONS. | kWh/t | 3.5 | 3.7 | 2.5 | 2.0 | 2.1 | 1.4 | 1.2 | 1.6 |

| | | RUN NO. 9 | RUN NO. 10 | RUN NO. 11 | RUN NO. 12 | RUN NO. 13 | RUN NO. 14 | RUN NO. 15 | RUN NO. 16 |
|---|---|---|---|---|---|---|---|---|---|
| TESTED MATERIAL | | BATCH 2 | BATCH 3 | BATCH 3 | BATCH 3 | BATCH 3 | BATCH 4 | BATCH 4 | BATCH 4 |
| FEED MATERIAL BULK DENSITY | g/cm$^3$ | 1.09 | 1.16 | 1.16 | 1.16 | 1.16 | 1.03 | 1.03 | 1.03 |
| MACHINE MODEL | | B-220QC | B-220QC | B-220QC | B-220QC | B-220QC | B-220QC | B-220QC | B-220QC |
| ROLLS PART NO. | | B2487 | B2487 | B2487 | B2487 | B2487 | B2487 | B2487 | B2487 |
| ROLL DIAMETER | mm | 305 | 305 | 305 | 305 | 305 | 305 | 305 | 305 |
| NO. OF POCKETS (CORRUGATIONS) | | 24 | 24 | 24 | 24 | 24 | 24 | 24 | 24 |
| NO. OF ROWS | | 1 | 1 | 1 | 1 | 1 | 1 | 1 | 1 |
| ROLL FACE WIDTH | mm | 76 | 76 | 76 | 76 | 76 | 76 | 76 | 76 |
| ROLL SPEED | rev/min | 3.0 | 3.0 | 3.0 | 3.0 | 16.4 | 3.0 | 3.0 | 3.0 |
| ROLL TORQUE | Nm | 5036 | 5108 | 3997 | 2982 | 4095 | 2895 | 2490 | 2162 |
| ROLL DRIVE POWER INDEX | kW | 1.59 | 1.61 | 1.26 | 0.94 | 7.05 | 0.91 | 0.78 | 0.68 |
| FEED SCREW PART NO. | | | | | | | | | |
| FEED SCREW OUTSIDE DIA | mm | 63 | 63 | 73 | 63 | 63 | 63 | 63 | 63 |
| FEED SCREW ROOT DIA | mm | 35 | 35 | 41 | 35 | 35 | 35 | 35 | 35 |
| FEED SCREW PITCH | mm | 51 | 51 | 51 | 51 | 51 | 51 | 51 | 51 |
| SCREW BARREL INSIDE DIA | mm | 76 | 76 | 76 | 76 | 76 | 76 | 76 | 76 |
| FEEDSCREWSPEED | rev/min | 94 | 71 | 69 | 82 | 391 | 67 | 66 | 66 |
| SCREW TORQUE | Nm | 72 | 129 | 93 | 43 | 67 | 228 | 148 | 76 |
| FEED SCREW DRIVE POWER IND | kW | 0.71 | 0.96 | 0.67 | 0.37 | 2.75 | 1.60 | 1.03 | 0.53 |
| PRESSURE IN HYDRAULIC SYS | MPa | | | | | | | | |
| INITIAL ACCUMULATOR PRESSURE | MPa | 6.89 | 6.89 | 6.89 | 6.89 | 6.89 | 6.89 | 6.89 | 6.89 |
| ROLL SEPARATING FORCE | MN | 0.202 | 0.205 | 0.148 | 0.086 | 0.153 | 0.185 | 0.141 | 0.084 |
| INITIAL ROLL GAP | mm | 0.4 | 0.4 | 0.4 | 0.4 | 0.4 | 0.4 | 0.4 | 0.4 |
| WEB THICKNESS | mm | 2.0 | 2.1 | 2.2 | 3.1 | 2.4 | 0.7 | 0.7 | 0.8 |
| BRIQUET CALCULATED PRESSURE | MPa | 66.57 | 67.56 | 48.78 | 28.34 | 50.42 | 60.97 | 46.47 | 27.68 |
| RATIO OF TANGENTIAL TO RADIAL STRESS | | 0.16 | 0.16 | 0.18 | 0.23 | 0.18 | 0.10 | 0.12 | 0.17 |
| MEASURED THROUGHPUT | t/h | 0.3253 | 0.3231 | 0.3061 | 0.3247 | 1.7124 | 0.2571 | 0.2592 | 0.2641 |
| BRIQUET TEMPERATURE DEG.C | | NOT MEAS | NOT MEAS | NOT MEAS | NOT MEAS | NOT MEAS | NOT MEAS | NOT MEAS | NOT MEAS |
| BRIQUET WEIGHT | g | 70.51 | 69.82 | 66.85 | 70.50 | 66.15 | 56.85 | 56.72 | 57.95 |
| BRIQUET NET PRODUCTION RATE | t/h | 0.3046 | 0.3016 | 0.2888 | 0.3046 | 1.5622 | 0.2456 | 0.2450 | 0.2503 |
| FINES PERCENTAGE | % | 6.4 | 6.6 | 5.7 | 6.2 | 8.8 | 4.5 | 5.5 | 5.2 |
| FEED SCREW EFFICIENCY | % | 48.1 | 59.5 | 50.1 | 51.8 | 57.2 | 56.5 | 57.8 | 58.9 |
| ROLL DRIVE ENERGY CONS. | kWh/t | 4.9 | 5.0 | 4.1 | 2.9 | 4.1 | 3.5 | 3.0 | 2.6 |

TABLE NO. 2-continued

Roll Press Set Up, Test Conditions and Process Characteristics

| | | | | | | | | |
|---|---|---|---|---|---|---|---|---|
| SCREW DRIVE ENERGY CONS. | kWh/t | 2.2 | 3.0 | 2.2 | 1.1 | 1.6 | 6.2 | 4.0 | 2.0 |

| | | RUN NO. 17 | RUN NO. 18 | RUN NO. 19 | RUN NO. 20 |
|---|---|---|---|---|---|
| TESTED MATERIAL | | BATCH 4 | BATCH 4 | BATCH 1 | BATCH 2 |
| FEED MATERIAL BULK DENSITY | g/cm³ | 1.03 | 1.03 | 1.11 | 1.09 |
| MACHINE MODEL | | B-220QC | B-100R | B-400A | B-400A |
| ROLLS PART NO. | | B2487 | B1116-4 | B4609 | B4609 |
| ROLL DIAMETER | mm | 305 | 130 | 460 | 460 |
| NO. OF POCKETS (CORRUGATIONS) | | 24 | 18 | 22 | 22 |
| NO. OF ROWS | | 1 | 2 | 2 | 2 |
| ROLL FACE WIDTH | mm | 76 | 51 | 152 | 152 |
| ROLL SPEED | rev/min | 15.1 | 3.0 | 2.4 | 2.4 |
| ROLL TORQUE | Nm | 2308 | 520 | 10800 | 18500 |
| ROLL DRIVE POWER INDEX | kW | 3.66 | 0.16 | 2.72 | 4.66 |
| FEED SCREW PART NO. | | | B180-9 | B469 | B469 |
| FEED SCREW OUTSIDE DIA | mm | 63 | 44 | 140 | 140 |
| FEED SCREW ROOT DIA | mm | 35 | 19 | 95 | 95 |
| FEED SCREW PITCH | mm | 51 | 40 | 76 | 76 |
| SCREW BARREL INSIDE DIA | mm | 76 | 51 | 148 | 148 |
| FEEDSCREWSPEED | rev/min | 391 | 57 | 48 | 73 |
| SCREW TORQUE | Nm | 65 | 79 | 420 | 285 |
| FEED SCREW DRIVE POWER IND | kW | 2.67 | 0.47 | 2.12 | 2.49 |
| PRESSURE IN HYDRAULIC SYS | MPa | | | | |
| INITIAL ACCUMULATOR PRESSURE | MPa | 6.89 | 6.89 | 6.89 | 6.89 |
| ROLL SEPARATING FORCE | MN | 0.086 | 0.054 | 0.210 | 0.399 |
| INITIAL ROLL GAP | mm | 0.4 | 0.6 | 1.0 | 1.0 |
| WEB THICKNESS | mm | 0.9 | 0.7 | 1.2 | 3.3 |
| BRIQUET CALCULATED PRESSURE | MPa | 28.34 | 46.67 | 21.03 | 39.96 |
| RATIO OF TANGENTIAL TO RADIAL | STRESS | 0.18 | 0.15 | 0.22 | 0.20 |
| MEASURED THROUGHPUT | t/h | 1.3247 | 0.0432 | 1.0215 | 1.1805 |
| BRIQUET TEMPERATURE | DEG.C | NOT MEAS | NOT MEAS | NOT MEAS | NOT MEAS |
| BRIQUET WEIGHT | g | 57.45 | 6.15 | 161.22 | 186.31 |
| BRIQUET NET PRODUCTION RATE | t/h | 1.2492 | 0.0399 | 1.0215 | 1.1805 |
| FINES PERCENTAGE | % | 5.7 | 7.7 | NOT MEAS | NOT MEAS |
| FEED SCREW EFFICIENCY | % | 49.9 | 24.8 | 50.6 | 39.2 |
| ROLL DRIVE ENERGY CONS. | kWh/t | 2.8 | 3.8 | 2.7 | 3.9 |
| SCREW DRIVE ENERGY CONS. | kWh/t | 2.0 | 10.9 | 2.1 | 1.8 |

TABLE 3

Product Evaluation

| | | RUN NO. 1 | RUN NO. 2 | RUN NO. 3 | RUN NO. 4 | RUN NO. 5 | RUN NO. 6 |
|---|---|---|---|---|---|---|---|
| BRIQUETWEIGHT | g | 57.54 | 57.43 | 58.46 | 65.45 | 66.52 | 68.72 |
| BRIQUETVOLUME | cm3 | 27.27 | 27.22 | 27.84 | 31.32 | 31.98 | 32.72 |
| BRIQUETDENSITY | g/cm3 | 2.11 | 2.11 | 2.10 | 2.09 | 2.08 | 2.10 |
| BRIQUETS BULK DENSITY | t/m3 | NOT MEAS. | NOT MEAS. | NOT MEAS. | NOT MEAS. | NOT MEAS. | NOT MEAS. |
| | | BRIQUETS "GREEN" STRENGTH | | | | | |
| MEAN CRUSHING FORCE | N | 1325.5 | 1227.6 | 1245.4 | 1316.6 | 1076.4 | 1797.1 |
| DROP HEIGHT AT FAILURE | m | 2.0 | 2.0 | 2.0 | 2.0 | 2.0 | 1.8 |
| NUMBER OF DROPS | | 6 | 6 | 17 | 8 | 10 | 1 |

| | | RUN NO. 7 | RUN NO. 8 | RUN NO. 9 | RUN NO. 10 | RUN NO. 11 | RUN NO. 12 |
|---|---|---|---|---|---|---|---|
| BRIQUETWEIGHT | g | 65.01 | 70.37 | 70.52 | 70.29 | 66.59 | 70.28 |
| BRIQUETVOLUME | cm3 | 30.81 | 32.28 | 32.05 | 32.09 | 30.83 | 33.31 |
| BRIQUETDENSITY | g/cm3 | 2.11 | 2.18 | 2.20 | 2.19 | 2.16 | 2.11 |
| BRIQUETS BULK DENSITY | t/m3 | NOT MEAS. | NOT MEAS. | NOT MEAS. | NOT MEAS. | NOT MEAS. | NOT MEAS. |
| | | BRIQUETS "GREEN" STRENGTH | | | | | |
| MEAN CRUSHING FORCE | N | 1556.8 | 1859.3 | 2143.9 | 2215.1 | >2224 | 1663.5 |
| DROP HEIGHT AT FAILURE | m | 1.5 | 1.2 | 2.0 | 1.8 | 2.0 | 1.2 |
| NUMBER OF DROPS | | 1 | 1 | 2 | 1 | 2 | 1 |

| | | RUN NO. 13 | RUN NO. 14 | RUN NO. 15 | RUN NO. 16 | RUN NO. 17 | RUN NO. 18 |
|---|---|---|---|---|---|---|---|
| BRIQUETWEIGHT | g | 66.02 | 55.48 | 56.79 | 57.61 | 57.66 | 6.14 |
| BRIQUETVOLUME | cm3 | 30.85 | 25.93 | 26.41 | 26.92 | 26.94 | 2.84 |
| BRIQUETDENSITY | g/cm3 | 2.14 | 2.14 | 2.15 | 2.14 | 2.14 | 2.16 |

TABLE 3-continued

Product Evaluation

| | | | | | | | |
|---|---|---|---|---|---|---|---|
| BRIQUETS BULK DENSITY | t/m3 | NOT MEAS. | NOT MEAS. | NOT MEAS. | NOT MEAS. | NOT MEAS. | NOT MEAS. |
| BRIQUETS "GREEN" STRENGTH | | | | | | | |
| MEAN CRUSHING FORCE | N | 2046.1 | 1192.0 | 1227.6 | 1120.9 | 1014.2 | 427.1 |
| DROP HEIGHT AT FAILURE | m | 1.2 | 2.0 | 2.0 | 2.0 | 2.0 | 2.0 |
| NUMBER OF DROPS | | 1 | >20 | >20 | >20 | >20 | >20 |

| | | RUN NO. 19 | RUN NO. 20 |
|---|---|---|---|
| BRIQUET WEIGHT | g | 161.22 | 186.31 |
| BRIQUET VOLUME | cm3 | NOT MEAS. | NOT MEAS. |
| BRIQUET DENSITY | g/cm3 | NOT MEAS. | NOT MEAS. |
| BRIQUETS BULK DENSITY | t/m3 | NOT MEAS. | NOT MEAS. |
| BRIQUETS "GREEN" STRENGTH | | | |
| MEAN CRUSHING FORCE | N | 1147.6 | 1912.6 |
| DROP HEIGHT AT FAILURE | m | 2.0 | 1.5 |
| NUMBER OF DROPS | | 6 | 1 |

TABLE 4

| | HYDRAULIC PRESSURE (psi) | ROLL CYCLES/ LOAD (Hz/A) | SCREW CYLCES/ LOAD Hz/A | RESULTS |
|---|---|---|---|---|
| MATERIAL: BENTONITE @0% MOISTURE | | | | |
| RUN 1 | 700 | 60/21.19 | 10/20.07 | Briquets appear crushed and brittle. |
| RUN 2 | 700 | 60/23.16 | 13/17.35 | No great improvement in briquet quality. |
| RUN 3 | 600 | 58/23.05 | 11/20.13 | Slightly stronger briquets, pressure sensitive. |
| RUN 4 | 700 | 58/23.35 | 11/19.89 | Quality improved, but pressure sensitive. |
| RUN 5 | 850 | 58/? | 13/? | Best looking briquets. |
| RUN 6 | 600 | 58/36.71 | 13/20.92 | Good briquets, but with cracks. |
| RUN 7 | 500 | 58/33 | 11/? | Best briquets but high pressure fluctuations. |
| RUN 8 | 500 | 60/22.33 | 11/19.67 | Moderate briquets. |
| RUN 9 | 400 | 58/23 | 11/19.9 | About the same as RUN 8. |
| MATERIAL: BENTONITE @7% MOISTURE | | | | |
| RUN 1 | 400 | 56/24 | 11/19.6 | Good briquets, but not well-filled. Surface had cracks. |
| RUN 2 | 300 | 56/24.9 | 11/21.5 | Briquets same as RUN 1, but had fewer surface cracks. |
| RUN 3 | 300 | 56/21.8 | 10/20.7 | Briquets were weaker and not well-filled. More lines generated. |
| RUN 4 | 300 | 54/27.0 | 11/20.1 | Quality improved, briquet was much fuller and strong. |
| RUN 5 | 300 | 52/20.4 | 17.1 | Best looking briquets. Green strength very high, a bit more flashing, but break off easily in tumbler. NOTE: Hydraulic pressure fluctuates 300–600 psi indicated depending on material flow from bucket elevator. |
| MATERIAL: BENTONITE @14% MOISTURE | | | | |
| RUN 6 | 300 | 52/21.86 | 11/19.03 | Thicker, stickier material results in better quality briquet: well-filled and high in |

TABLE 4-continued

| | HYDRAULIC PRESSURE (psi) | ROLL CYCLES/ LOAD (Hz/A) | SCREW CYLCES/ LOAD Hz/A) | RESULTS |
|---|---|---|---|---|
| RUN 7 | 300 | 58/21.5 | 11/20.6 | green strength. There are surface cracks. Briquets are crumbly and wea, very few are well-formed. Rough edges on most briquets. |
| RUN 8 | 300 | 58/24.4 | 13/19.3 | Better briquet than previous runs, some surface cracks, but less than before. |
| RUN 9 | 300 | 58/25.1 | 13/20.3 | Run withbelt slippage in mind. Longer run produced briquets like RUN 8 but a bit more splitting and/or minimal clamshelling. |
| RUN 10 | 300 | 58/? | 15/? | Run to see max feed screw speed. Belts slipped, motor tripped. |
| RUN 11 | 200 | 58/? | 14/? | Same objective and results as RUN 10, with less pressure to reduce load. |
| RUN 12 | 200 | 54/? | 13/? | Same results as RUN 11, this run was made with roll and screw speed decreased for reduced loading (pressure also reduced). |
| RUN 13 | 200 | 45/20.9 | 6/20.0 | Objective was to determine minimum speeds and pressures. Fines were generated, not briquets. |
| RUN 14 | 200 | 58/29.6 | 13/20.11 | Briquets were full, but feeder motor trips after short run. |
| RUN 15 | 400 | 58/31.3 | 13/18.7 | Belts slipped immediately, feed motor tripped. |
| RUN 16 | 300 | 58/24.1 | 12/21.4 | Good briquets, but with some surface cracks and flash. Green strength was high. |
| RUN 17 | 250 | 58/30.3 | 58/21.0 | Very good briquet with some flash, no cracks. Full briquet with high green strength. |
| RUN 18 | 250 | 60/? | 15/? | Immediate belt slippage and trip |
| RUN 19 | 250 | 58/23 | 11/20.0 | Most full briquet of all previous runs, but edges not clean. No cracks, no splitting, high strength. |
| RUN 20 | 250 | 56/22.3 | 11/21.6 | About the same as RUN 19, but run at a slower capacity. |
| RUN 21 | 300 | 58/26.3 | 13/19.3 | Briquets are satisfactory, but highly sensitive to hydraulic pressure. Higher tendency to show splitting. |
| RUN 22 | 250 | 58/22.1 | 12/21.4 | Best briquet of all previous trials, but still slightly sensitive to hydraulic pressure, though not problematic. No cracks on surface, |

TABLE 4-continued

| | HYDRAULIC PRESSURE (psi) | ROLL CYCLES/ LOAD (Hz/A) | SCREW CYLCES/ LOAD Hz/A) | RESULTS |
|---|---|---|---|---|
| RUN 23 | 250 | 60/22.4 | 13/19 | consistent quality, high strength. Best briquet for highest capacity. No cracks or splitting. Consistently good quality and high strength. |

TABLE 3

COALINGA PILOT ABANDONMENT RESULTS

| Well | Well Type | Case | TD | Top Perf | Initial Fluid L. | Top Bot. Plug | "A" Pt Fluid L |
|---|---|---|---|---|---|---|---|
| 60-11A | Producer | 1 | 2,680 | 2,360 | 1,297 | 2,240 | NA |
| 2-8-11A | Producer | 1 | 1,660 | 1,449 | — | 1,196 | NA |
| 3-7-11A | Producer | 1 | 1,880 | 1,166 | 482 | 1,465 | NA |
| 146-11A | Producer | 1 | 1,800 | 1,604 | 1,400 | 1,462 | NA |
| 45-11A | Producer | 1 | 1,600 | 1,503 | 1,460 | 1,407 | NA |
| 243-11A | Producer | 1 | 1,800 | 1,617 | 1,455 | 1,487 | NA |
| 138-11A | Producer | 1 | 1,622 | 1,432 | 1,270 | 1,281 | NA |
| Amity 9-3-1D | Cyclic | 1 | 973 | 447 | 355 | 342 | NA |
| 8-4A-1D | Cyclic | 1 | 605 | 162 | 50 | 1 | NA |
| 2-8-25D | Cyclic | 1 | 1,130 | 885 | 720 | 529 | NA |
| 2-7-25D | Cyclic | 1 | 1,150 | 1,006 | 720 | 810 | NA |
| 2-9-7C | Cyclic | 2 | 1,820 | 1,500 | 1,320 | 1,372 | 1,091 |
| 1-7-19C | Cyclic | 2 | 1,900 | 1,642 | — | 1,554 | 1,303 |
| 4-8-7C | Producer | 2 | 1,800 | 1,673 | 700 | 1,573 | 1,237 |
| 4-7-7C | Producer | 2 | 1,810 | 1,681 | 280 | 1,558 | 1,147 |
| 4-7-17C | Water Inj | 3 | 3,405 | 3,278 | 380 | 3,141 | 2,322 |
| 3-6-17C | Water Inj | 3 | 3,270 | 3,152 | 350 | 2,985 | 2,316 |
| Arica 6-6-7C | Producer | 3 | 2,095 | 1,984 | — | 1,850 | 1,468 |
| Arica 5-6-7C | Producer | 3 | 1,965 | 1,842 | 480 | 1,763 | 1,382 |

| Well | Top "A" Pt Plug | Fresh Water Fluid L. | T/Fresh Water Plug | Surf. Fluid L. | Top Surf. Plug | Aban. Time (hrs) | Doggr Approval |
|---|---|---|---|---|---|---|---|
| 60-11A | NA | NA | NA | 480 | 10 | 12.5 | Yes |
| 2-8-11A | NA | NA | NA | 504 | 9 | 15.5 | Yes |
| 3-7-11A | NA | NA | NA | — | 10 | 7 | Yes |
| 146-11A | NA | NA | NA | — | 8 | 11 | Yes |
| 45-11A | NA | NA | NA | 355 | 11 | 6.5 | Yes |
| 243-11A | NA | NA | NA | at surf | 3 | 6 | Yes |
| 138-11A | NA | NA | NA | — | 8 | 4.5 | Yes |
| Amity 9-3-1D | NA | NA | NA | at surf | 11 | 4.5 | Yes |
| 8-4A-1D | NA | NA | NA | at surf | NA | 4 | Yes |
| 2-8-25D | NA | NA | NA | at surf | 9 | 7 | Yes |
| 2-7-25D | NA | NA | NA | at surf | 1 | 5 | Yes |
| 2-9-7C | 1,091 | at surf | 232 | at surf | 9 | 6.5 | Yes |
| 1-7-19C | 1,303 | at surf | 352 | at surf | 11 | 7 | Yes |
| 4-8-7C | 1,237 | at surf | 399 | at surf | 10 | 7 | Yes |
| 4-7-7C | 1,147 | at surf | 355 | — | 10 | 19.5 | Yes |
| 4-7-17C | 2,322 | 98 | 1,041 | — | 1 | 27.5 | Yes |
| 3-6-17C | 2,316 | at surf | 1,117 | at surf | 13 | 7.5 | Yes |
| Arica 6-6-7C | 1,468 | 106 | 507 | at surf | 8 | 10 | Yes |
| Arica 5-6-7C | 1,382 | at surf | 567 | — | 8 | 28 | Yes |

Note:
All depths in feet from ground level

What is claimed is:

1. A method for forming a material for plugging a well comprising
    a. obtaining a feedstock comprising bentonite in admixture with a proportion of water to permit the formation of compacted nodules having a density of at least 2.0 g/cm$^3$ and a mean particle survival at a crush force of at least 800 newtons and capable of having at least 50% survival when dropped 1.5 meters onto a concrete surface,
    b. feeding the feedstock under pressure to a continuous roll press machine under conditions to permit the formation of said compacted nodules and
    c. recovering the compacted nodules.
2. The method of claim 1 wherein the feedstock comprises from about 35% to about 98% by weight bentonite, from about 0% to about 45% by weight nonbentonite solids, and from about 2% to about 20% by weight nonconnate water.
3. The method of claim 1 wherein the feedstock comprises from about 45% to about 95% by weight bentonite, from about 0% to about 35% by weight nonbentonite solids, and from about 5% to about 20% by weight nonconnate water.
4. The method of claim 1 wherein the feedstock comprises from about 64% to about 88% by weight bentonite, from about 0% to about 20% by weight nonbentonite solids, and from about 12% to about 16% by weight nonconnate water.
5. The method of claim 1 wherein the feedstock consists essentially of from about 85% to about 90% by weight bentonite and from about 10% to about 15% by weight nonconnate water.
6. The method of claim 1 wherein the pressure is a pressure of at least about 1 Mpa.
7. The method of claim 1 wherein the pressure is a pressure of at least about 3 Mpa.
8. The method of claim 1 wherein the pressure is a pressure of at least about 5 Mpa.
9. The method of claim 1 wherein said roller press is operated at a speed of from about 2 RPM to about 50 RPM.

* * * * *